US012687504B2

(12) United States Patent
Liang

(10) Patent No.: US 12,687,504 B2
(45) Date of Patent: Jul. 21, 2026

(54) RAPID X-RAY RADIATION IMAGING SYSTEM AND RELATED METHOD

(71) Applicant: JST Power Equipment, Inc., Lake Mary, FL (US)

(72) Inventor: Haoning Liang, Beijing (CN)

(73) Assignee: JST POWER EQUIPMENT, INC., Lake Mary, FL (US)

( * ) Notice: Subject to any disclaimer, the term of this patent is extended or adjusted under 35 U.S.C. 154(b) by 244 days.

(21) Appl. No.: 18/553,309

(22) PCT Filed: Apr. 6, 2022

(86) PCT No.: PCT/US2022/071565
§ 371 (c)(1),
(2) Date: Sep. 29, 2023

(87) PCT Pub. No.: WO2022/217234
PCT Pub. Date: Oct. 13, 2022

(65) Prior Publication Data
US 2024/0102944 A1     Mar. 28, 2024

Related U.S. Application Data

(63) Continuation-in-part of application No. 17/314,003, filed on May 6, 2021, now abandoned.

(30) Foreign Application Priority Data

Apr. 7, 2021     (WO) ............... PCT/CN2021/085791
Apr. 7, 2021     (WO) ............... PCT/CN2021/085792

(51) Int. Cl.
*G01N 23/04*     (2018.01)
*G01N 23/083*     (2018.01)

(52) U.S. Cl.
CPC ........... *G01N 23/04* (2013.01); *G01N 23/083* (2013.01); *G01N 2223/3306* (2013.01); *G01N 2223/643* (2013.01)

(58) Field of Classification Search
None
See application file for complete search history.

(56) References Cited

U.S. PATENT DOCUMENTS 4,422,177 A * 12/1983 Mastronardi ........ A61B 6/0487
                                                                378/10
5,127,039 A      6/1992 Hesch
(Continued)

FOREIGN PATENT DOCUMENTS

| CN | 111398319 | 7/2020 |
|---|---|---|
| CN | 111426708 | 7/2020 |

(Continued)

OTHER PUBLICATIONS

U.S. Appl. No. 18/552,987, filed Sep. 28, 2023 Haoning Liang.

*Primary Examiner* — David J Makiya
*Assistant Examiner* — Miya Downing
(74) *Attorney, Agent, or Firm* — Allen, Dyer, Doppelt + Gilchrist, PA

(57) ABSTRACT

An X-ray radiation imaging system is for imaging a tubular object. The X-ray radiation imaging system may include an enclosure, and a motorized base configured to rotate the tubular object within the enclosure. The X-ray radiation imaging system may further include an X-ray source adjacent the motorized base. The X-ray source may be configured to irradiate the tubular object with X-ray radiation while the motorized base rotates the tubular object. The X-ray radiation imaging system may also include an X-ray detector adjacent the tubular object, and the X-ray detector may receive the X-ray radiation from the tubular object. The X-ray radiation imaging system may include a processor (Continued)

coupled to the X-ray source and the X-ray detector and configured to generate an image of the tubular object.

22 Claims, 11 Drawing Sheets

(56)                    References Cited

U.S. PATENT DOCUMENTS

| | | | |
|---|---|---|---|
| 5,909,478 | A | 6/1999 | Polichar et al. |
| 2003/0048938 | A1 | 3/2003 | Wang et al. |
| 2004/0016886 | A1 | 1/2004 | Ringermacher et al. |
| 2004/0105526 | A1 | 6/2004 | Zhang et al. |
| 2004/0218716 | A1* | 11/2004 | Freifeld ................. G01N 23/04 |
| | | | 378/62 |
| 2011/0249793 | A1 | 10/2011 | Lalena et al. |
| 2014/0172223 | A1* | 6/2014 | Murphy ............... G05D 1/0289 |
| | | | 701/25 |
| 2020/0330051 | A1 | 10/2020 | Wang |
| 2024/0371143 | A1* | 11/2024 | Bastuck ................... G06T 7/60 |

FOREIGN PATENT DOCUMENTS

| | | |
|---|---|---|
| CN | 111665274 | 9/2020 |
| EP | 2757389 | 7/2014 |
| KR | 20110079594 | 7/2011 |
| KR | 20200130960 | 11/2020 |
| WO | 2004051311 | 6/2004 |

\* cited by examiner

RAPID X-RAY RADIATION IMAGING SYSTEM AND RELATED METHOD

RELATED APPLICATION

This application claims priority to U.S. application Ser. No. 17/314,003 filed May 6, 2021, which claims priority to PCT application serial nos. PCT/CN2021/085791, PCT/CN2021/085792, both filed Apr. 7, 2021, which are all hereby incorporated herein in their entirety by reference.

TECHNICAL FIELD

The present disclosure relates to the field of power transmission, and, more particularly, to power transformers and related methods.

BACKGROUND

The modern power transmission system is a network connecting power plants to geographically remote large and small loads. Generally, the power transmission system comprises a power plant generating the power to be distributed, and a network of high voltage power transmission lines transmitting the power from the power plant to the remote geographic area where the loads exist. Once in the area, the power transmission system comprises a plurality of substations for respective regions. Each substation comprises step down transformers and switchgear equipment to route and convert the high voltage power signal (i.e. >115,000 VAC) to a medium voltage power signal (i.e. 2,400-69,000 VAC).

From that point, the power transmission system comprises medium voltage power transmission lines and low voltage power transmission lines, which transmit the power to the smaller loads. Of course, there are additional step-down transformers for the low voltage loads (i.e. 240-600 VAC), which include all residential and typical commercial applications. Since it is much more efficient to transmit power at high and medium voltages, the power transmission system necessarily comprises a large number of transformers located close to the smaller loads.

A typical transformer, regardless of voltage level, comprises a magnetic core, and sets of electrically conductive windings surrounding the magnetic core. The electrically conductive windings need to be electrically insulated from adjacent windings. Also, due to the operational power level of the transformers in the power transmission system, there is a desire to thermally cool the transformers. In one application, the windings and the magnetic core are immersed in dielectric oil (e.g. mineral oil). Although the thermal conductivity performance of these immersed transformers is good, when these transformers fail, the event may be problematic, due to the flammable nature of the dielectric oil. Moreover, in substations, there may be several adjacent components, which can be damaged.

To prevent these failures, dielectric oil transformers must be serviced and replaced on a recommended schedule. Another alternative approach is the cast resin transformer coil. In this approach, rather than dielectric oil, the electrically conductive windings are encased in a dielectric resin. Although the dielectric resin does not need to be serviced, the resin does provide less thermal dissipation than oil immersed transformers. Moreover, the cast resin transformer coil is not easily repairable.

SUMMARY

Generally, an X-ray radiation imaging system is for imaging a tubular object (e.g. a cast resin transformer coil).

The X-ray radiation imaging system may include an enclosure, and a motorized base configured to rotate the tubular object within the enclosure. The X-ray radiation imaging system may further include at least one X-ray source adjacent the motorized base. The at least one X-ray source may be configured to irradiate the tubular object with X-ray radiation while the motorized base rotates the tubular object. The X-ray radiation imaging system may also include at least one X-ray detector adjacent the tubular object, and the at least one X-ray detector may receive the X-ray radiation from the tubular object. The X-ray radiation imaging system may include a processor coupled to the at least one X-ray source and the at least one X-ray detector and configured to generate an image of the tubular object.

In some embodiments, the X-ray radiation imaging system may include a gantry within the enclosure and coupled to the at least one X-ray source and the at least one X-ray detector. In particular, the X-ray radiation imaging system may also include at least one detector arm coupled between the gantry and the at least one X-ray detector, and at least one source arm coupled between the gantry and the at least one X-ray source. The processor may be configured to cause the at least one detector arm and the at least one source arm to respectively align the at least one X-ray detector and the at least one X-ray source with respect to the tubular object. The at least one detector arm and the at least one source arm may be configured to extend vertically and simultaneously with equal alignment.

In some embodiments, the at least one X-ray detector may comprise a plurality of X-ray detectors spaced annularly with respect to the tubular object, and the at least one X-ray source may comprise a plurality of X-ray sources spaced annularly with respect to the tubular object and respectively opposite the plurality of X-ray detectors. In other embodiments, the at least one X-ray detector and the at least one X-ray source may be aligned along a tangent of the tubular object.

More specifically, the at least one X-ray detector may comprise a line scanner X-ray detector. The X-ray radiation imaging system may further comprise a conveyor extending through the enclosure and to position the tubular object on the motorized base. For example, the enclosure is opaque to X-ray radiation. Also, the motorized base may comprise an automated guided trolley (AGV).

Another aspect is directed to a method for making an X-ray radiation imaging system for imaging a tubular object. The method may include providing a motorized base configured to rotate the tubular object within the enclosure, and coupling at least one X-ray source adjacent the motorized base. The at least one X-ray source may be configured to irradiate the tubular object with X-ray radiation while the motorized base rotates the tubular object. The method may comprise coupling at least one X-ray detector adjacent the tubular object, the at least one X-ray detector to receive the X-ray radiation from the tubular object, and coupling a processor to the at least one X-ray source and the at least one X-ray detector and to generate an image of the tubular object.

BRIEF DESCRIPTION OF THE DRAWINGS

FIG. 5 is a schematic top view diagram of a fourth embodiment of the X-ray radiation imaging system, according to the present disclosure.

DETAILED DESCRIPTION

Figure 1:
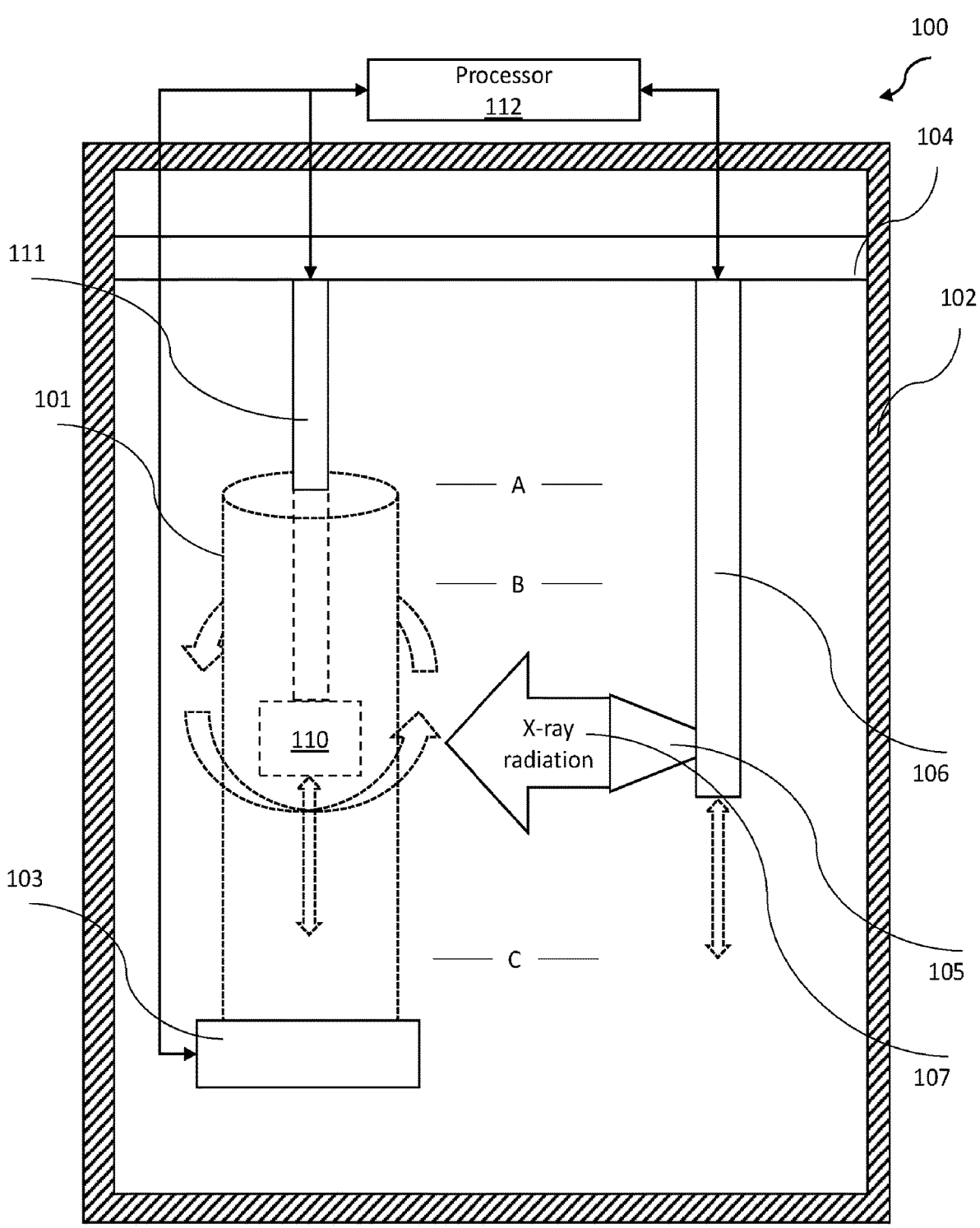
FIG. 1 is a schematic diagram of a first embodiment of an X-ray radiation imaging system, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

It may be helpful to evaluate cast resin transformer coils during production. During production, the cast resin transformer coil is readily inspected and not-energized, providing safe and controlled environment. Moreover, if the cast resin transformer coil has a manufacturing defect, this may be discovered before failure occurs in the field.

X-ray detectors have wide usage in several fields. For example, X-ray imaging is ubiquitous in the medical imaging field. In some industrial applications, X-ray imaging, i.e. radiography, is used to verify the mechanical integrity and fidelity of components.

Figure 2A:
FIG. 2A is a schematic top view diagram of the X-ray radiation imaging system of FIG. 1.
Figure 2A:
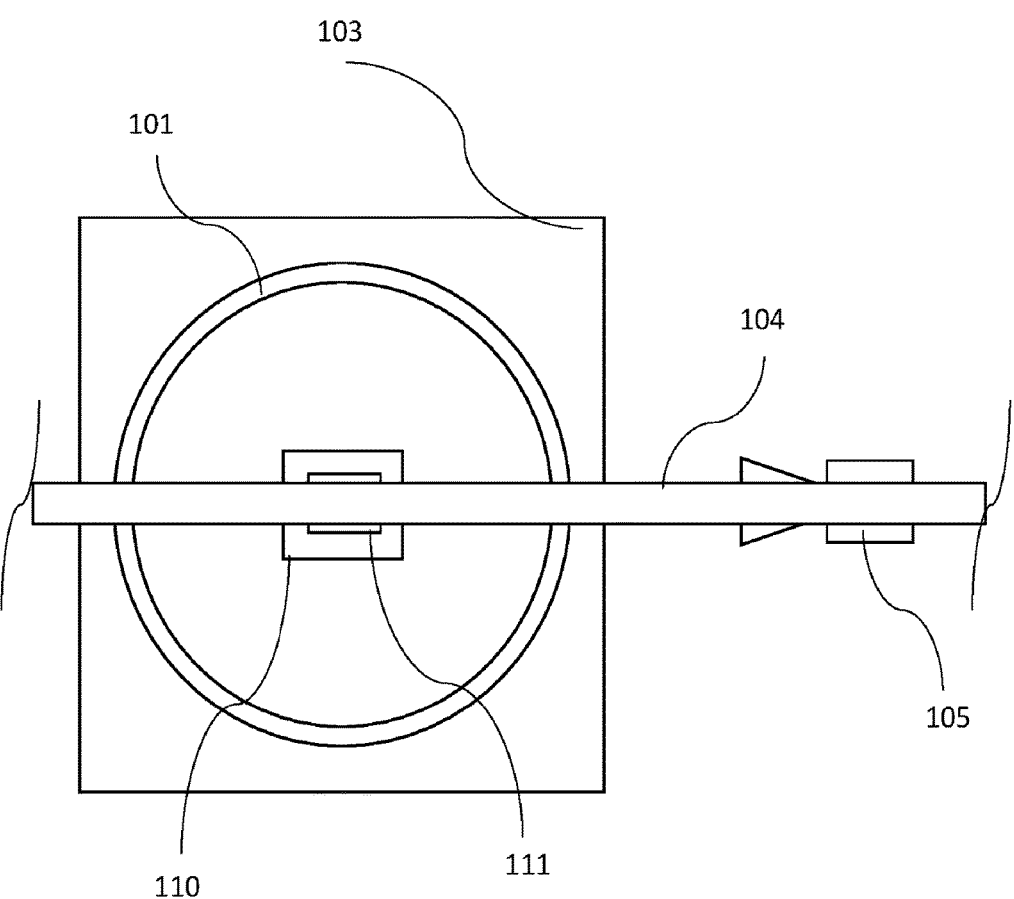
Figure 2B:
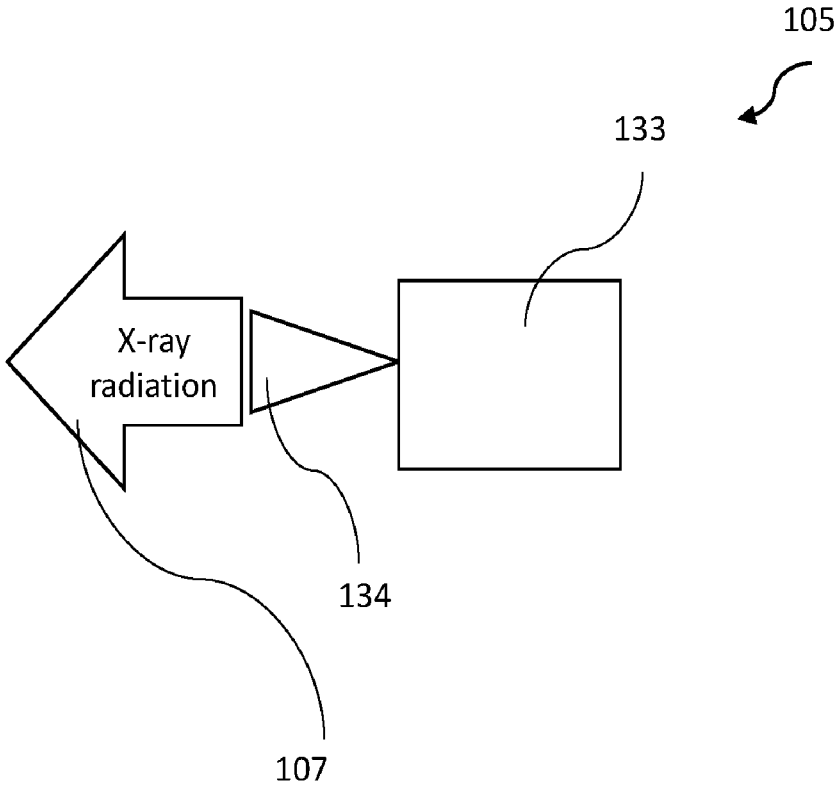
FIG. 2B is a schematic top view diagram of the X-ray radiation imaging system of FIG. 1.

Referring initially to FIGS. 1-2B, an X-ray radiation imaging system 100 according to the present disclosure is now described. The X-ray radiation imaging system 100 is for imaging a tubular object 101 (e.g. a cast resin transformer coil). The X-ray radiation imaging system 100 provides an approach to defect detection in cast resin transformer coils. Moreover, the X-ray radiation imaging system 100 performs the testing in a highly scalable and fast manner.

The X-ray radiation imaging system 100 illustratively includes an enclosure 102. As will be appreciated, the enclosure 102 may comprise one or more materials that are opaque to X-radiation, such as lead or concrete. Although the illustrated embodiment operates with X-ray radiation, other frequencies/types of radiation may be used. For example, the radiation may comprise gamma radiation, neutron radiation, beta particle radiation, proton particle radiation, and alpha particle radiation.

The X-ray radiation imaging system 100 illustratively includes a motorized base 103 to be positioned within the enclosure 102 and configured to rotate the tubular object 101 within the enclosure. In some embodiments, the motorized base 103 comprises a platform, and a hydraulic piston under the platform for vertically elevating and rotating the tubular object 101. Here, the motorized base 103 is positioned within the enclosure 102, and the tubular object 101 is placed on the motorized base via a crane, or manual manipulation, for example. In some embodiments, the motorized base 103 comprises an AGV, which moves the tubular object 101 in and out of the enclosure 102 for examination.

In some embodiments, the platform of the motorized base 103 comprises a removable top retainer device. The top retainer device is configured to receive and retain the tubular object 101 for scanning. For example, the top retainer device may comprise a wide post configured to receive the tubular object 101.

The X-ray radiation imaging system 100 illustratively includes a gantry 104 within the enclosure 102. The gantry 104 may comprise a mobile gantry in some embodiments, and comprises first and second legs extending to the ground surface, and first and second casters coupled respectively to the first and second legs.

The X-ray radiation imaging system 100 illustratively includes an X-ray source 105 coupled to the gantry 104 and being adjacent the motorized base 103, and a source arm 106 coupled between the gantry and the X-ray source. The X-ray source 105 is configured to irradiate the tubular object 101 with X-ray radiation 107 while the motorized base 103 rotates the tubular object 101.

The X-ray radiation imaging system 100 illustratively comprises an X-ray detector 110 coupled to the gantry 104 and being radially within the tubular object 101, and a detector arm 111 coupled between the gantry 104 and the X-ray detector. The X-ray detector 110 receives the X-ray radiation 107 from the tubular object 101. In some embodiments, the X-ray detector 110 may comprise a line scanner X-ray detector.

In some embodiments, the gantry 104 may be omitted. In these embodiments (FIG. 9), the source arm 106 and the detector arm 111 may extended from a floor of the enclosure 102.

The X-ray radiation imaging system 100 illustratively includes a processor 112 coupled to the X-ray source 105, the X-ray detector 110, and the motorized base 103. The processor 112 is configured to generate an image of the tubular object 101. In particular, as will be appreciated, for line scanner embodiments, the processor 112 is configured to produce an assembled image of the tubular object 101.

The processor 112 is configured to cause the detector arm 111 and the source arm 106 to respectively vertically align the X-ray detector 110 and the X-ray source 105 with respect to the tubular object 101. The detector arm 111 and the source arm 106 are configured to extend vertically and simultaneously with equal alignment while the motorized base 103 rotates the tubular object 101. For example, as illustrated in FIG. 1, the detector arm 111 and the source arm 106 are configured to image the tubular object 101 at three discrete levels A, B, C.

In applications where the tubular object 101 is a cast resin transformer coil, the processor 112 is configured to process the assembled image of the tubular object 101 to evaluate spacing in the plurality of coils in the cast resin transformer coil. The processor 112 is configured to generate a metric for spacing between the plurality of coils based upon the assembled image. The generating of the metric comprises generating a plurality of spacing values for the plurality of coils of the cast resin transformer coil 101, and determining a distribution of the plurality of spacing values. In some embodiments, the generating of the plurality of spacing values for the plurality of coils of the cast resin transformer coil 101 may comprise edge detection processing.

The processor 112 is configured to determine whether the cast resin transformer coil 101 has a defect based upon the metric for spacing between the plurality of coils. In particular, the metric for spacing between the plurality of coils is based upon the distribution of values. In this instance, the metric represents the percentage of coils outside first or second standard deviation of the distribution. In short, the metric flags spacing outliers, which would be indicative of a manufacturing defect.

In some embodiments, the processor 112 is configured to determine whether the cast resin transformer coil 101 has a defect based upon processing a sample region of the cast resin transformer coil. The selection of the sample region may be manually determined by a user, or randomly selected. In some embodiments, the selected sample region may be statistically derived from past results. For example, the sample region may comprise a region having the greatest number of failures in past scanning operations.

Another aspect is directed to a method for making an X-ray radiation imaging system 100 for imaging a tubular object 101. The method includes positioning a motorized base 103 within an enclosure 102 and configured to rotate the tubular object 101, positioning a gantry 104 within the enclosure, and coupling at least one X-ray source 105 to the gantry and being adjacent the motorized base. The at least one X-ray source 105 is configured to irradiate the tubular object 101 with X-ray radiation 107 while the motorized base 103 rotates the tubular object. The method comprises coupling at least one X-ray detector 110 to the gantry 104 and being adjacent the tubular object 101, the at least one X-ray detector to receive the X-ray radiation 107 from the tubular object, and coupling a processor 112 to the at least one X-ray source 105 and the at least one X-ray detector and to generate an image of the tubular object.

Referring now to FIG. 2B, the X-ray source 105 illustratively includes a radiation source 133, and a collimator 134 coupled to the radiation source and configured to selectively direct the radiation. In particular, the collimator 134 may comprise a shield comprising a material opaque to X-ray radiation, for example, lead. In embodiments where the X-ray detector 110 comprises a line scanner X-ray detector, the X-ray source 105 moves in alignment with the line scanner X-ray detector.

Depending on the field of view of the X-ray detector 110, the projection angle of the collimator 134 may be adjusted. In some embodiments, the collimator 134 may be swapped out to change scanning patterns.

For line scanner applications, the orientation of the X-ray source 105 and the X-ray detector 110 may be varied depending on application. In one embodiment, the X-ray detector 110 may be oriented transverse to the longitudinal axis of the tubular object 101. Here, the X-ray detector 110 is configured to scan individual radial sections of the tubular object 101. Once a radial section (e.g., a ° 90 radial section) is scanned, the motorized base 103 is configured to rotate the tubular object 101 to expose a next radial section, and the scanning operation repeats. In this embodiment, the image of the tubular object 101 needs to be stitched together from the individual scans of the radial sections of the tubular object.

In another embodiment, the X-ray detector 110 may be oriented substantially parallel to the longitudinal axis of the tubular object 101. Here, the motorized base 103 cooperates to rotate the tubular object 101 while the X-ray detector 110 is configured to scan the tubular object 101 in one single pass. If the line scanner has a length less than the longitudinal axis of the tubular object 101, a spiral path math be used to scan the tubular object.

In other embodiments, the X-ray detector 110 comprises a two-dimensional detector configured to scan sections of the tubular object 101. After the tubular object 101 is scanned, the images from the two-dimensional scanner are stitched together.

As will be appreciated, the processor 112 is configured to perform the above stitching operations. In some embodiments, the stitching operations may be performed without considering the path of the X-ray detector 110. Here, the processor 112 is configured to perform mosaic processing to assembly the individual scans. In other embodiments, the processor 112 is configured to stitch based upon one or more of circular image stitching, vertical image stitching, or helical image stitching.

Figure 3:
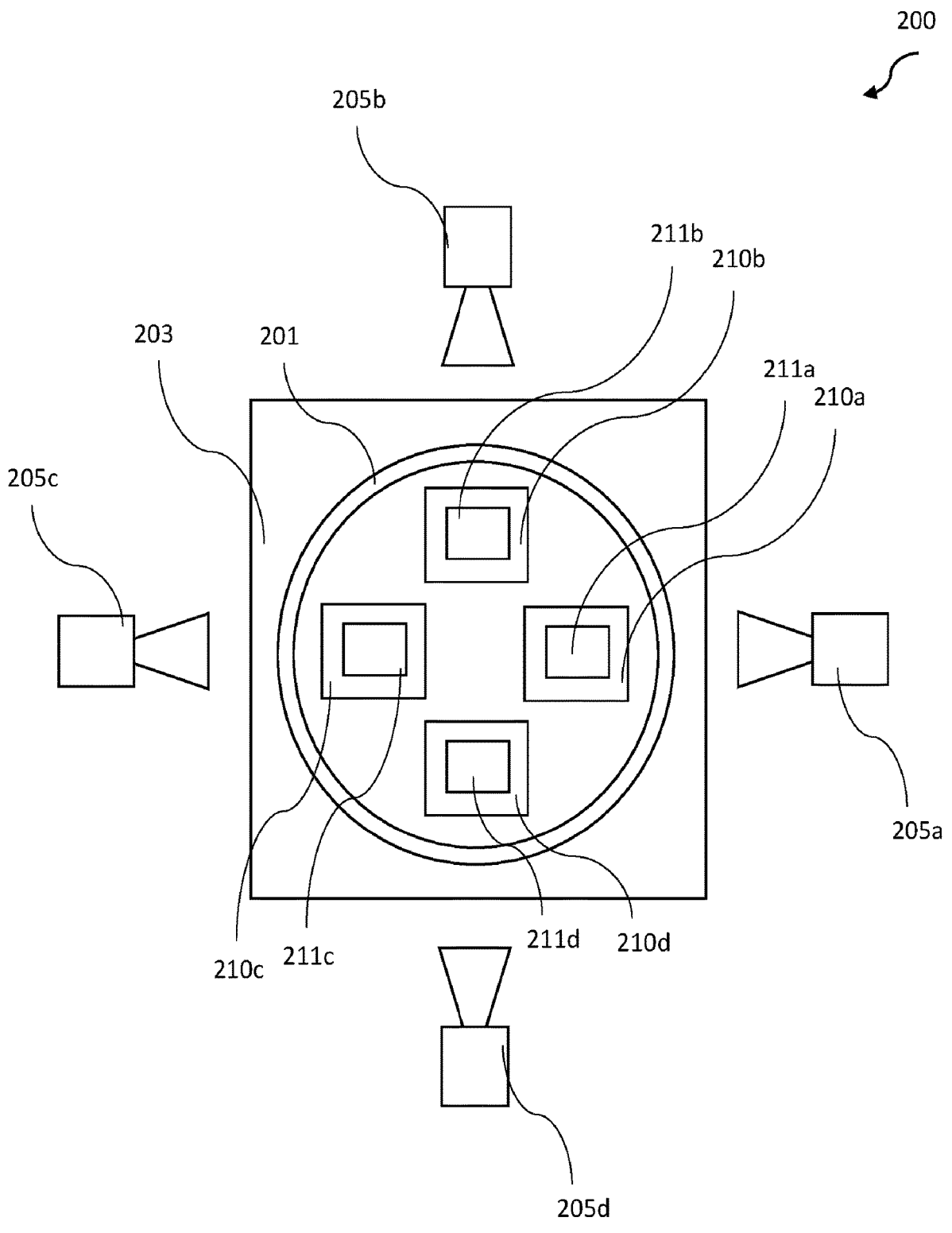
FIG. 3 is a schematic top view diagram of a second embodiment of the X-ray radiation imaging system, according to the present disclosure.

Referring now additionally to FIG. 3, another embodiment of the X-ray radiation imaging system 200 is now described. In this embodiment of the X-ray radiation imaging system 200, those elements already discussed above with respect to FIGS. 1-2B are incremented by 100 and most require no further discussion herein. This embodiment differs from the previous embodiment in that this X-ray radiation imaging system 200 illustratively includes a plurality of X-ray detectors 210a-210d spaced annularly with respect to the tubular object 201, and a plurality of X-ray sources 205a-205d spaced annularly with respect to the tubular object 201 and respectively radially opposite the plurality of X-ray detectors.

In this embodiment, the plurality of X-ray detectors 210a-210d is positioned within the tubular object 201 and angularly spaced at 90°. The plurality of X-ray sources 205a-205d is positioned outside the tubular object 201 and angularly spaced at 90° in alignment with the plurality of X-ray detectors 210a-210d. Of course, the angular spacing is exemplary, the number of the plurality of X-ray detectors 210a-210d and the plurality of X-ray sources 205a-205d may be varied, which will change the angular spacing respectively. As will be appreciated, this embodiment may scan the tubular object 201 with a minimal 90° rotation, which increases the speed of the scanning.

Figure 4:
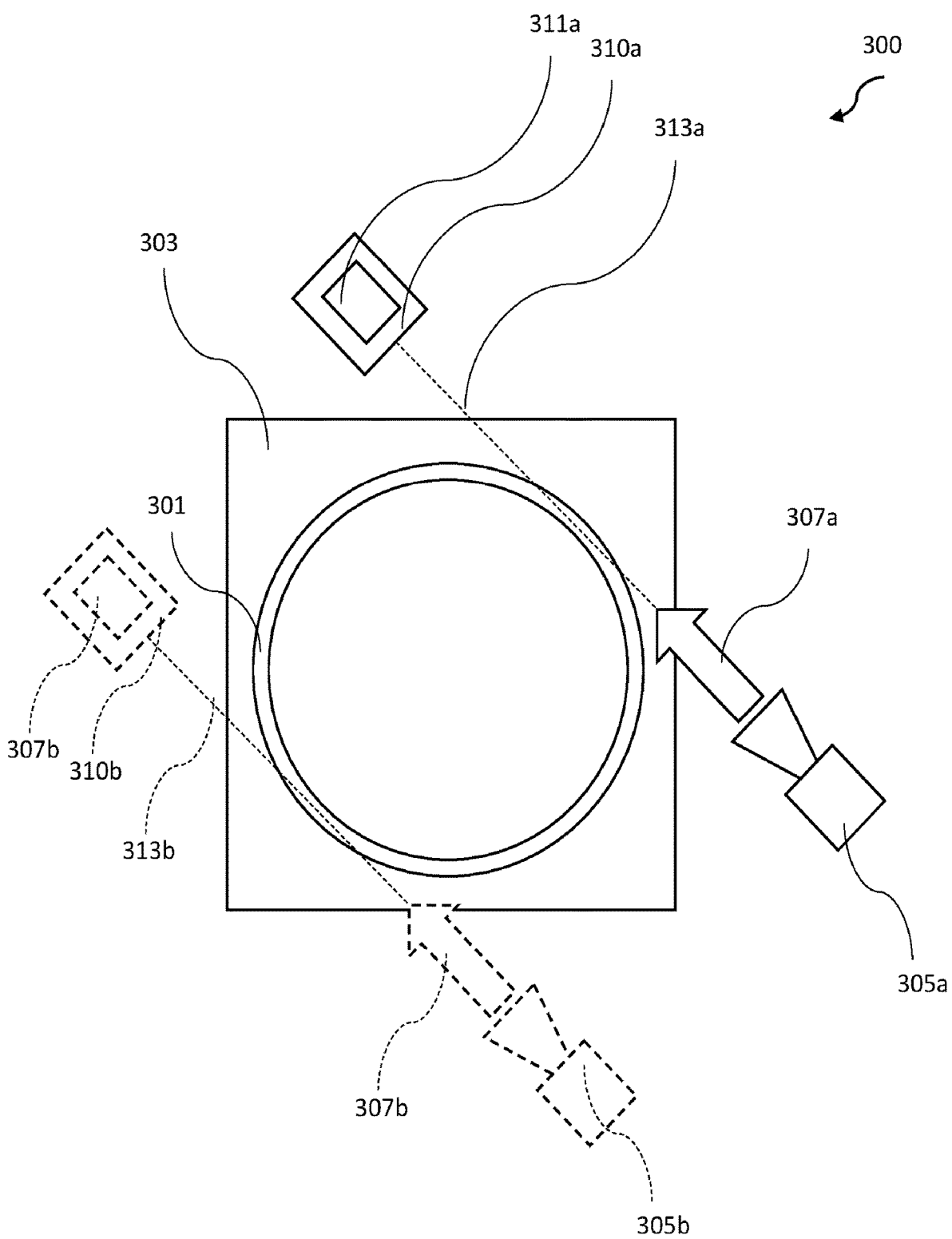
FIG. 4 is a schematic top view diagram of a third embodiment of the X-ray radiation imaging system, according to the present disclosure.

Referring now additionally to FIG. 4, another embodiment of the X-ray radiation imaging system 300 is now described. In this embodiment of the X-ray radiation imaging system 300, those elements already discussed above with respect to FIGS. 1-2B are incremented by 200 and most require no further discussion herein. This embodiment differs from the previous embodiment in that this X-ray radiation imaging system 300 illustratively includes an X-ray detector 310a and an X-ray source 305a aligned along a tangential line 313a of the tubular object 301.

Although this embodiment shows only a single X-ray detector 310a and X-ray source 305a set, in other embodiments, there may be additional X-ray detector 310b and X-ray source 305b sets (shown with dashed lines) placed at varying tangential lines 313a-313b. These embodiments would permit faster scanning of the tubular object 301. Helpfully, this embodiment may be used for the tubular object 301 when the inner diameter is less than a minimum clearance width for the X-ray detectors 310a-310b to be inserted within the tubular object.

Figure 5:
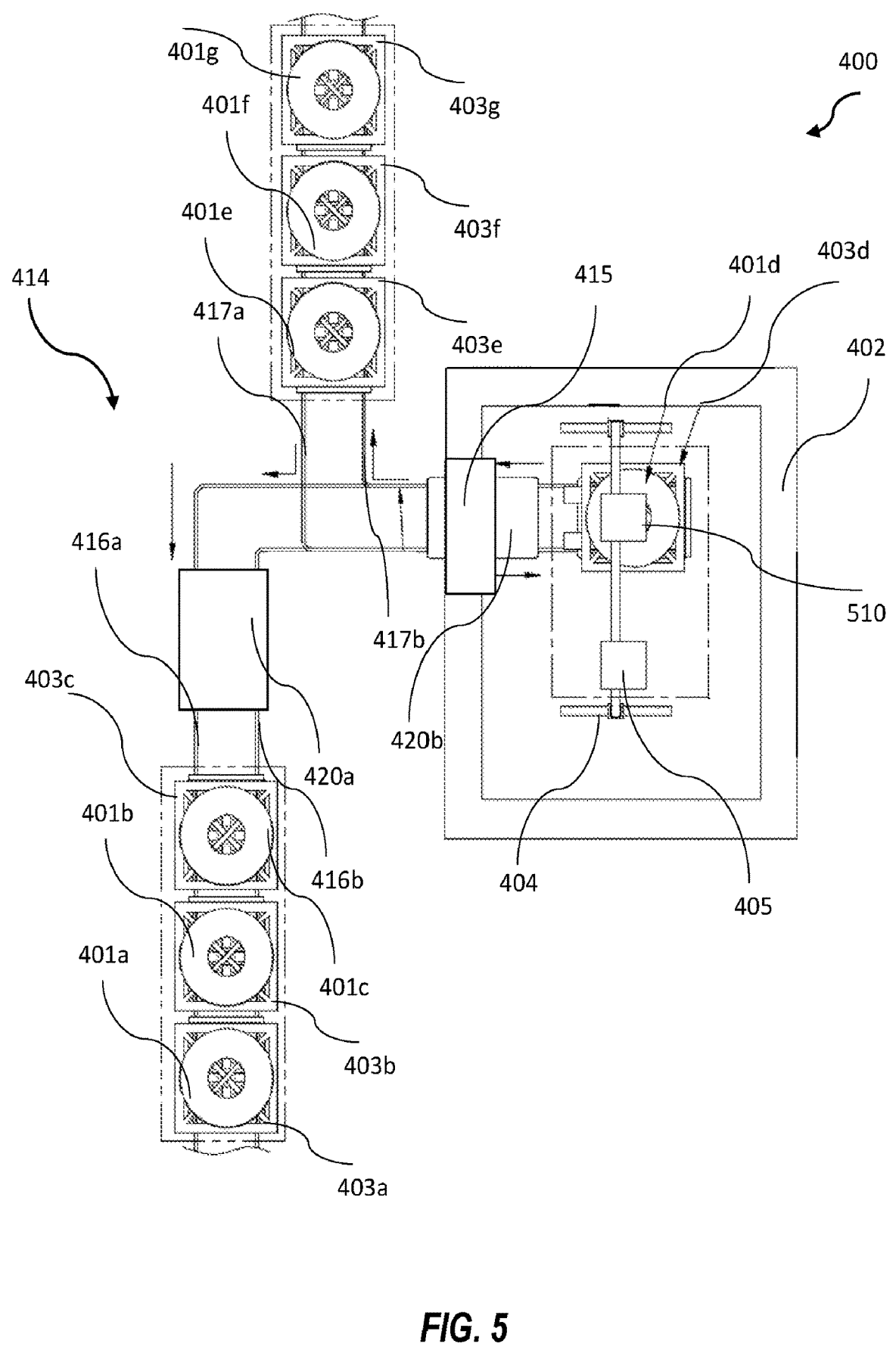
Figure 6:
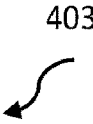
FIG. 6 is a schematic side view diagram of a motorized base from the X-ray radiation imaging system of FIG. 5.
Figure 6:
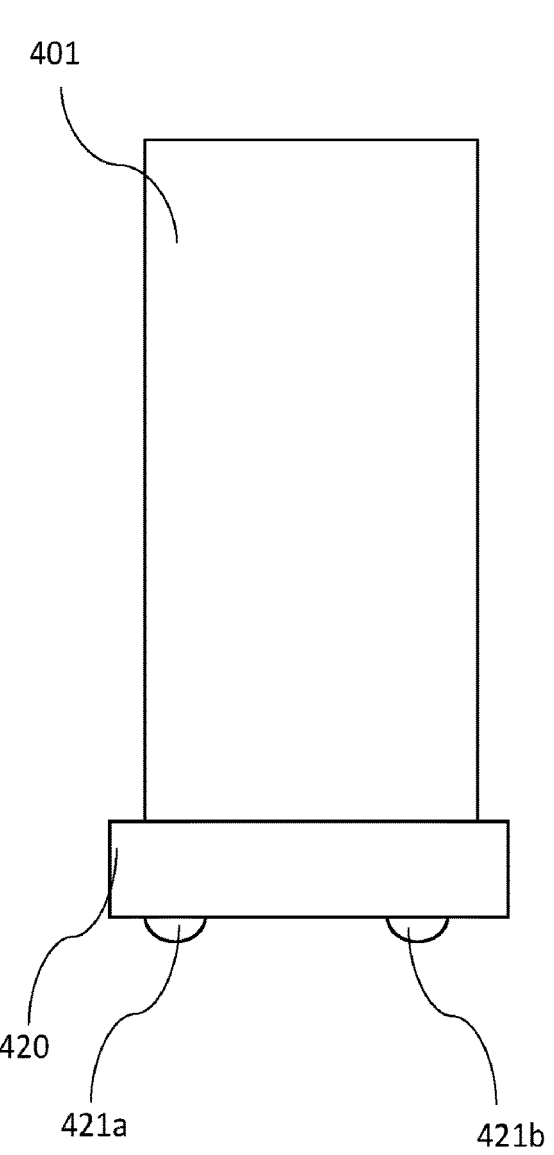

Referring now additionally to FIGS. 5-6, another embodiment of the X-ray radiation imaging system 400 is now described. In this embodiment of the X-ray radiation imaging system 400, those elements already discussed above with respect to FIGS. 1-2B are incremented by 300 and most require no further discussion herein. This embodiment differs from the previous embodiment in that this X-ray radiation imaging system 400 illustratively includes a conveyor 414 extending through the enclosure 402 and to position the tubular object 401 on the motorized base 403. Here, the enclosure 402 illustratively includes a door 415, and the conveyor 414 extends through the door.

As perhaps best seen in FIG. 5, the conveyor 414 illustratively comprises a first set of rails 416a-416b extending from a queue of uninspected tubular objects 401a-401d and through the door 415. The conveyor 414 illustratively comprises a second set of rails 417a-417b extending through the door 415 and to a queue of inspected tubular objects 401e-401g.

As perhaps best seen in FIG. 6, the motorized base 403a-403b comprises an AGV. In this illustrated embodiment, the X-ray radiation imaging system 400 illustratively includes first and second motorized bases 403a-403b for carrying the tubular objects from the queue of uninspected tubular objects 401a-401d to the enclosure 402 and then to the queue of inspected tubular objects 401e-401g. Each of the first and second motorized bases 403a-403b comprises a base 420, a set of wheels 421a-421b coupled to the base, one or more motors driving the set of wheels, and circuitry configured to control motion of the one or more motors. Also, the door 415 is closable and controlled automatically to permit movement of the first and second motorized bases 403a-403b.

In this embodiment, the first and second motorized bases 403a-403b are responsible for translational movement along the first set of rails 416a-416b and the second set of rails 417a-417b and for the rotational movement of the tubular object 401a-401g during the scan. Helpfully, the X-ray radiation imaging system 400 may provide for automatic and easy testing of the tubular objects 401a-401g without user intervention. Of course, in other embodiments, the movement of the tubular objects 401a-401g may be done manually, or with other equipment, such as a fork lift.

Figure 7A:
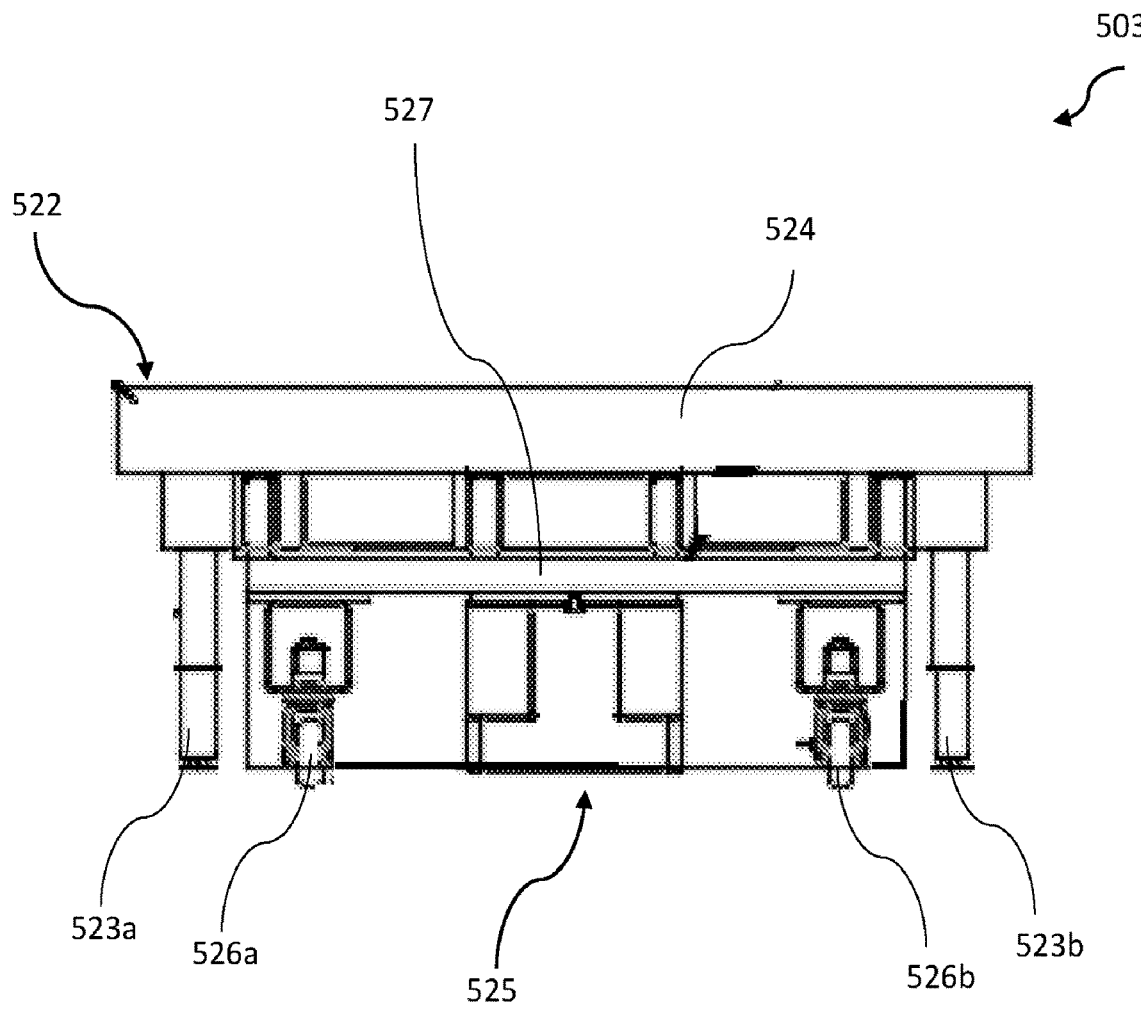
FIGS. 7A and 7B are schematic side view diagrams of a motorized base from a fifth embodiment of the X-ray radiation imaging system in retracted and lifted positions, respectively, according to the present disclosure.
Figure 7B:
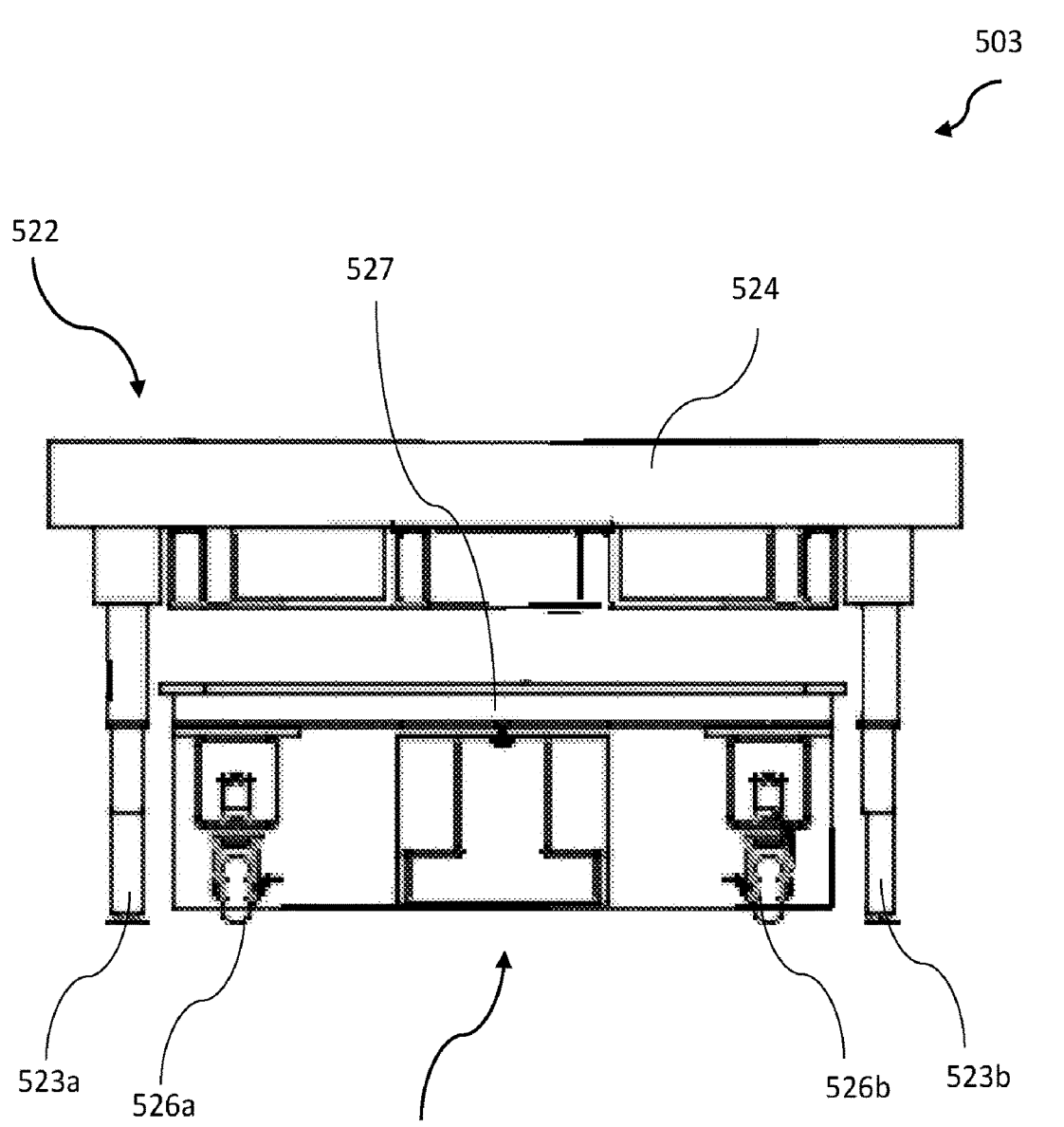

Referring now additionally to FIGS. 7A-7B, another embodiment of the motorized base 503 is now described. In this embodiment of the motorized base 503, those elements already discussed above with respect to FIGS. 1-2B are incremented by 400 and most require no further discussion herein. This embodiment differs from the previous embodiment in that this motorized base 503 illustratively includes a first vertical left mechanism 522 comprising first and second vertical lift legs 523a-523b, and a first base 524 coupled to the first and second vertical lift legs. As shown in FIG. 7B, the first and second vertical lift legs 523a-523b adjust the height of the first base 524.

The motorized base 503 illustratively includes a second mechanism 525 for rotational and translation movement. The second mechanism 525 illustratively comprises first and second casters 526a-526b, and a second base 527 coupled to the first and second casters.

The motorized base 503 can be used in embodiments of the X-ray radiation imaging system 400 with the conveyor 414, such as depicted in FIGS. 5-6. In such an application, the second mechanism 525 would move the tubular objects 401a-401g to and from the enclosure 402, and the first vertical left mechanism 522 would remain stationary within the enclosure. In particular, for a tubular object 401a-401g under test, the second mechanism 525 would retrieve and place the tubular object onto the first vertical left mechanism 522. Alternatively, the first vertical left mechanism 522 could remain stationary outside the enclosure, one being adjacent the queue of untested tubular objects 401a-401g and another being adjacent the queue of tested tubular objects 401a-401g. The first vertical left mechanism 522 would enable easy loading and unloading of the tubular objects 401a-401g.

Figure 8:
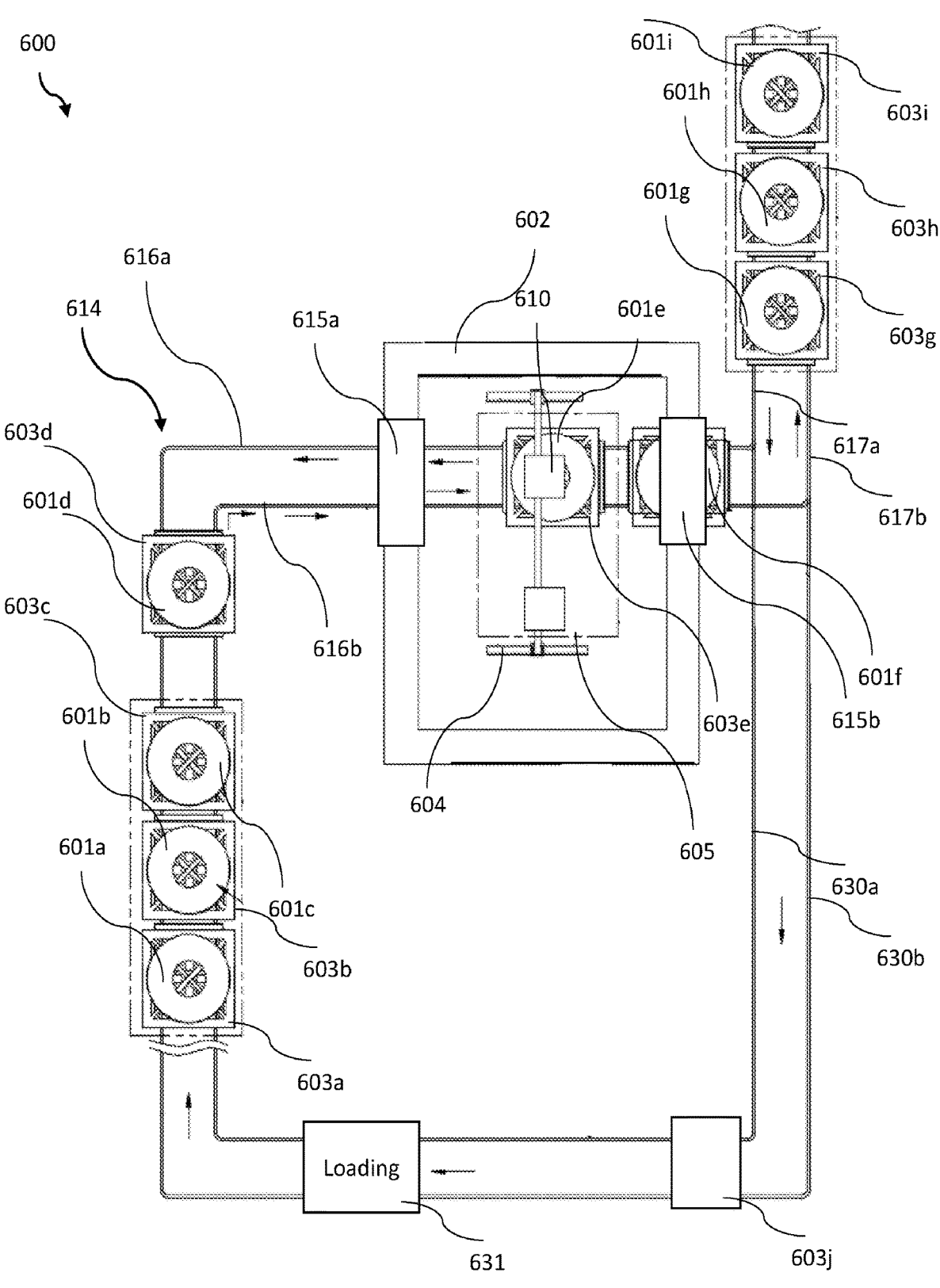
FIG. 8 is a schematic top view diagram of a sixth embodiment of the X-ray radiation imaging system, according to the present disclosure.

Referring now additionally to FIG. 8, another embodiment of the X-ray radiation imaging system 600 is now described. In this embodiment of the X-ray radiation imaging system 600, those elements already discussed above with respect to FIGS. 1-2B are incremented by 500 and most require no further discussion herein. This embodiment differs from the previous embodiment in that this X-ray radiation imaging system 600 illustratively includes an enclosure 602 having first and second doors 615a-615b. Also, the conveyor 614 illustratively includes three paths. The first path 616a-616b is from the queue of the untested tubular objects 601a-601c to the enclosure 602, and the second path 617a-617b is from the enclosure 602 to the queue of tested tubular objects 601g-601i. The third path 630a-630b is from the queue of tested tubular objects 601g-601i to the queue of the untested tubular objects 601a-601c.

During typical operation of the X-ray radiation imaging system 600, the motorized base 603d is transiting a respective tubular object 601d to the enclosure 602 for testing. Simultaneously, the motorized base 603e is positioning and rotating a respective tubular object 601e for testing, and another motorized base 603f is transiting a respective tubular object 601f from testing to the storage of the tested tubular objects 601g-601i. Also, the motorized base 603j without any load is transiting to a loading station 631, where an untested tubular object is loaded thereon. Once loaded, the motorized base 603j is transiting to the queue of the untested tubular objects 601a-601c.

Advantageously, this embodiment of the X-ray radiation imaging system 600 is able to process and test a large number of tubular objects 601a-601i quickly. Indeed, for applications where the tubular object 601a-601i comprises a cast resin transformer coil, this is helpful due to the scale of manufacturing.

Figure 9:
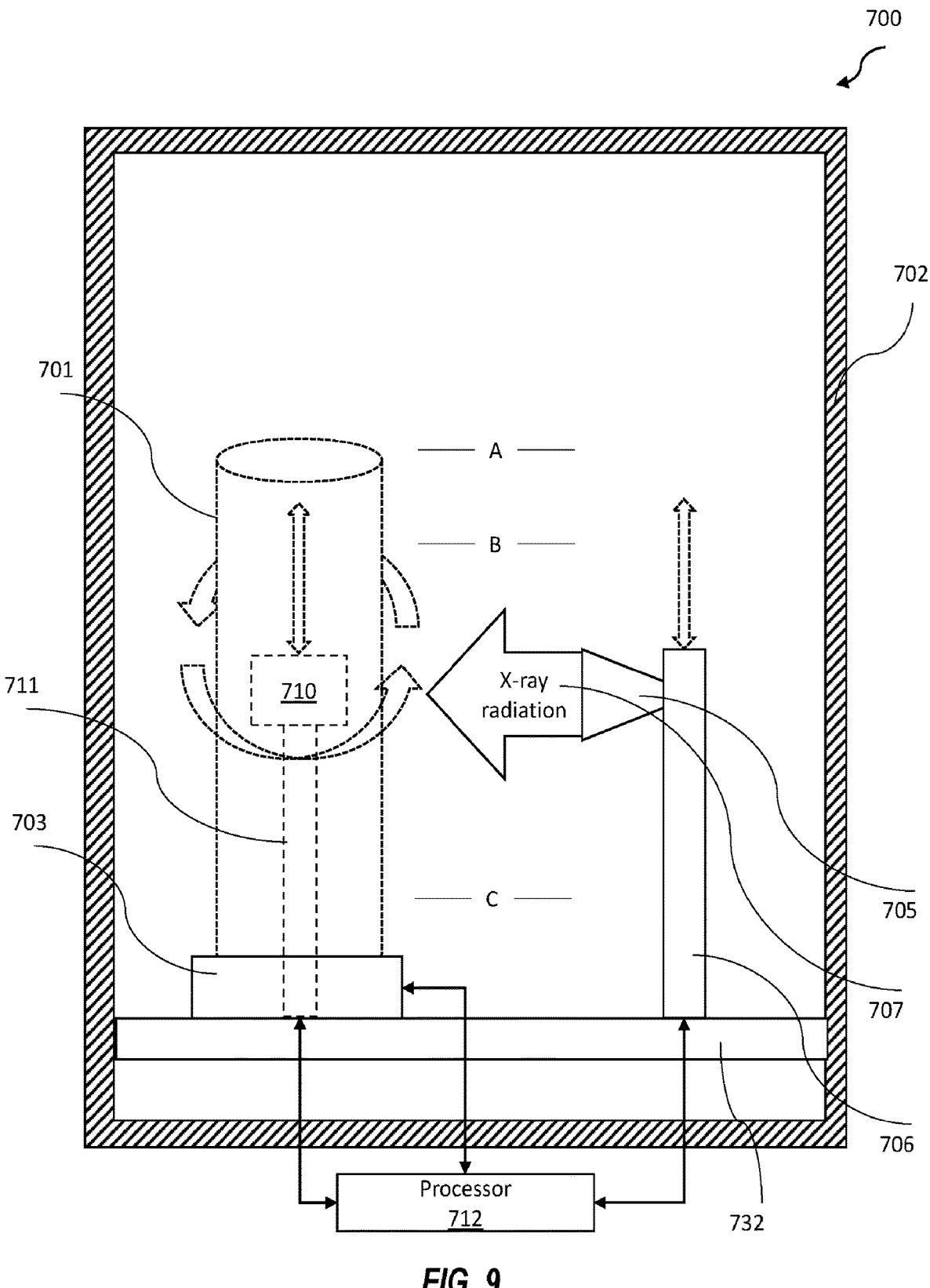
FIG. 9 is a schematic diagram of a seventh embodiment of an X-ray radiation imaging system, according to the present disclosure.

Referring now additionally to FIG. 9, another embodiment of the X-ray radiation imaging system 700 is now described. In this embodiment of the X-ray radiation imaging system 700, those elements already discussed above with respect to FIGS. 1-2B are incremented by 600 and most require no further discussion herein. This embodiment differs from the previous embodiment in that this X-ray radiation imaging system 200 illustratively includes the detector arm 711 and the source arm 706 extend from a floor 732 of the enclosure 702.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. An X-ray radiation imaging system for imaging a cast resin transformer, the X-ray radiation imaging system comprising:

an enclosure;

a motorized base configured to rotate the cast resin transformer within the enclosure;

at least one X-ray source adjacent to the motorized base, the at least one X-ray source configured to irradiate the cast resin transformer with X-ray radiation while the motorized base rotates the cast resin transformer;

at least one X-ray detector adjacent to the cast resin transformer, the at least one X-ray detector to receive the X-ray radiation from the cast resin transformer; and a processor coupled to the at least one X-ray source and the at least one X-ray detector and configured to generate an image of the cast resin transformer, and determine a spacing in a plurality of coils in the cast resin transformer based upon the image of the cast resin transformer.

2. The X-ray radiation imaging system of claim 1 further comprising a gantry within the enclosure and coupled to the at least one X-ray source and the at least one X-ray detector.

3. The X-ray radiation imaging system of claim 2 further comprising:

at least one detector arm coupled between the gantry and the at least one X-ray detector; and at least one source arm coupled between the gantry and the at least one X-ray source;

wherein the processor is configured to cause the at least one detector arm and the at least one source arm to respectively align the at least one X-ray detector and the at least one X-ray source with respect to the cast resin transformer.

4. The X-ray radiation imaging system of claim 3 wherein the at least one detector arm and the at least one source arm are configured to extend vertically and simultaneously with equal alignment.

5. The X-ray radiation imaging system of claim 1 wherein the at least one X-ray detector comprises a plurality of X-ray detectors spaced annularly with respect to the cast resin transformer; and wherein the at least one X-ray source comprises a plurality of X-ray sources spaced annularly with respect to the cast resin transformer and respectively opposite the plurality of X-ray detectors.

6. The X-ray radiation imaging system of claim 1 wherein the at least one X-ray detector and the at least one X-ray source are aligned along a tangent of the cast resin transformer.

7. The X-ray radiation imaging system of claim 1 wherein the at least one X-ray detector comprises a line scanner X-ray detector.

8. The X-ray radiation imaging system of claim 1 further comprising a conveyor extending through the enclosure and to position the cast resin transformer on the motorized base.

9. The X-ray radiation imaging system of claim 1 wherein the enclosure is opaque to X-ray radiation.

10. The X-ray radiation imaging system of claim 1 wherein the motorized base comprises an automated guided trolley (AGV).

11. The X-ray radiation imaging system of claim 1 wherein the motorized base comprises a platform, and a hydraulic piston under the platform and configured to vertically elevate and rotate the cast resin transformer.

12. An X-ray radiation imaging system for imaging a cast resin transformer, the X-ray radiation imaging system comprising:

an enclosure;

a motorized base configured to rotate the cast resin transformer within the enclosure;

a gantry within the enclosure;

at least one X-ray source coupled to the gantry and being adjacent to the motorized base, the at least one X-ray source configured to irradiate the cast resin transformer with X-ray radiation while the motorized base rotates the cast resin transformer;

at least one source arm coupled between the gantry and the at least one X-ray source;

at least one X-ray detector coupled to the gantry and being adjacent to the cast resin transformer, the at least one X-ray detector to receive the X-ray radiation from the cast resin transformer;

at least one detector arm coupled between the gantry and the at least one X-ray detector; and a processor coupled to the at least one X-ray source and the at least one X-ray detector and configured to cause the at least one detector arm and the at least one source arm to respectively align the at least one X-ray detector and the at least one X-ray source with respect to the cast resin transformer, the at least one detector arm and the at least one source arm extending vertically and simultaneously with equal alignment, generate an image of the cast resin transformer, and determine a spacing in a plurality of coils in the cast resin transformer based upon the image of the cast resin transformer.

13. The X-ray radiation imaging system of claim 12 wherein the at least one X-ray detector comprises a plurality of X-ray detectors spaced annularly with respect to the cast resin transformer; and wherein the at least one X-ray source comprises a plurality of X-ray sources spaced annularly with respect to the cast resin transformer and respectively opposite the plurality of X-ray detectors.

14. The X-ray radiation imaging system of claim 12 wherein the at least one X-ray detector and the at least one X-ray source are aligned along a tangent of the cast resin transformer.

15. The X-ray radiation imaging system of claim 12 wherein the at least one X-ray detector comprises a line scanner X-ray detector.

16. The X-ray radiation imaging system of claim 12 further comprising a conveyor extending through the enclosure and to position the cast resin transformer on the motorized base.

17. The X-ray radiation imaging system of claim 12 wherein the enclosure is opaque to X-ray radiation.

18. The X-ray radiation imaging system of claim 12 wherein the motorized base comprises an automated guided trolley (AGV).

19. A method for making an X-ray radiation imaging system for imaging a cast resin transformer, the method comprising:

providing a motorized base configured to rotate the cast resin transformer within an enclosure;

coupling at least one X-ray source to be adjacent to the motorized base, the at least one X-ray source configured to irradiate the cast resin transformer with X-ray radiation while the motorized base rotates the cast resin transformer;

coupling at least one X-ray detector to be adjacent to the cast resin transformer, the at least one X-ray detector to receive the X-ray radiation from the cast resin transformer; and coupling a processor to the at least one X-ray source and the at least one X-ray detector and to generate an image of the cast resin transformer, and determine a spacing in a plurality of coils in the cast
      resin transformer based upon the image of the cast
      resin transformer.

20. The method of claim 19 further comprising positioning a gantry within the enclosure and coupled to the at least one X-ray source and the at least one X-ray detector.

21. The method of claim 20 further comprising:

coupling at least one detector arm between the gantry and the at least one X-ray detector; and coupling at least one source arm between the gantry and the at least one X-ray source;

wherein the processor is configured to cause the at least one detector arm and the at least one source arm to respectively align the at least one X-ray detector and the at least one X-ray source with respect to the cast resin transformer.

22. The method of claim 19 wherein the at least one X-ray detector comprises a plurality of X-ray detectors spaced annularly with respect to the cast resin transformer; and wherein the at least one X-ray source comprises a plurality of X-ray sources spaced annularly with respect to the cast resin transformer and respectively opposite the plurality of X-ray detectors.

\* \* \* \* \*